United States Patent
Gerhardt

[19]

[11] Patent Number: 5,934,612
[45] Date of Patent: Aug. 10, 1999

[54] WINGTIP VORTEX DEVICE FOR INDUCED DRAG REDUCTION AND VORTEX CANCELLATION

[75] Inventor: Heinz Adolf Gerhardt, Redondo Beach, Calif.

[73] Assignee: Northrop Grumman Corporation, Los Angeles, Calif.

[21] Appl. No.: 09/038,814

[22] Filed: Mar. 11, 1998

[51] Int. Cl.[6] .................................................. B64D 33/00
[52] U.S. Cl. ............................................. 244/58; 244/199
[58] Field of Search .................................. 244/199, 58, 59

[56] References Cited

U.S. PATENT DOCUMENTS

| | | | |
|---|---|---|---|
| 1,245,902 | 11/1917 | Gretsky | 244/58 |
| 1,717,552 | 6/1929 | Dunn | 244/58 |
| 1,850,066 | 3/1932 | Altieri | 244/58 |
| 1,932,532 | 10/1933 | Plillips | 244/58 |
| 2,485,218 | 10/1949 | Shaw | 244/199 |
| 4,917,332 | 4/1990 | Patterson, Jr. | 244/58 |

*Primary Examiner*—Galen L. Barefoot
*Attorney, Agent, or Firm*—Terry J. Anderson; Karl J. Hoch, Jr.

[57] ABSTRACT

The present invention is a wingtip vortex device for induced drag reduction and vortex cancellation. The wingtip vortex device is an aerodynamic drag reduction system installed at the wingtips of an aircraft. The wingtip vortex device comprises an impeller located ahead of the wingtip chord, a wind turbine device located behind the wingtip chord, and an intermediate gear device for coupling the impeller with the wind turbine and/or for generating power. Thus, the wingtip vortex device is self-contained as the impeller is powered by the vortex-driven turbine. As a result, induced drag is reduced without requiring an external power source such as the aircraft propulsion system.

24 Claims, 1 Drawing Sheet

WINGTIP VORTEX DEVICE FOR INDUCED DRAG REDUCTION AND VORTEX CANCELLATION

BACKGROUND OF THE INVENTION

1. Field of the Invention

The present invention relates to vortex cancellation for aircraft in general, and in particular to a wingtip vortex device for induced drag reduction and vortex cancellation at the wingtips of aircraft.

2. Related Art

Current wingtip vortex devices operate on the principle of self-cancellation of counter-rotating vortices generated in tandem. Typical vortex devices employ a propeller or related rotary device mounted at wingtips to produce vortex cancellation. Many studies of anti-swirl-producing propellers have been performed and documented.

Typically, a propeller is installed ahead of or behind the wingtip chord where, as a byproduct of thrust generation, the propeller generates swirl, while also weakening the wingtip vortex, to thereby reduce induced drag. However, since current propellers are designed to produce thrust efficiently, they are only marginally effective in producing counter-swirl. Such a deficiency was pointed out by Alexander Lippisch as reported by Snyder and Zumwalt in "Effects of Wingtip-Mounted Propellers on Wing Lift and Induced Drag", Journal of Aircraft, Vol. 6, No. 5, September–October 1969.

As a result, an impeller was disclosed as a more effective alternative. An impeller consists of an oval-oblong-shaped body having a multitude of slender fins on its periphery. The impeller can efficiently produce swirling flow. Snyder and Zumwalt achieved a 64-percent induced drag reduction with an impeller as described.

Nevertheless, although the impeller disclosed by Snyder and Zumwalt is quite efficient in producing swirling flow, it generates little or no thrust. Also, Snyder and Zumwalt do not provide information on the power needed to drive the impeller. Thus, a process which requires mechanical power (presumably from the propulsion system) to reduce drag has little technical merit.

Therefore, what is needed is an impeller device that limits or eliminates wingtip vortices by utilizing a "free" power source, such as the rotational energy of the wingtip vortex itself, to drive the impeller. What is also needed is a wind turbine device installed downstream of a wingtip of an aircraft to not only extract mechanical power from the vortex, but to reduce induced drag at the same time. What is additionally desired is a device that utilizes the power generated from the turbine device for driving aircraft subsystems.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is a wingtip vortex device for induced drag reduction and vortex cancellation.

The wingtip vortex device of the present invention is an aerodynamic drag reduction system installed at the wingtips of an aircraft. The wingtip vortex device comprises an impeller located ahead of the wingtip chord, a wind turbine device located behind the wingtip chord, and an intermediate gear device for coupling the impeller with the wind turbine and/or for generating power. Thus, the wingtip vortex device is self-contained and the impeller is powered by the vortex-driven turbine. As a result, induced drag is reduced without requiring an external power source such as the aircraft propulsion system.

A feature of the present invention is embodied in an impeller device that limits or eliminates wingtip vortices by utilizing the rotational energy of the wingtip vortex itself to drive the impeller. Another feature of the present invention is embodied in a wind turbine device installed on a wingtip of an aircraft to not only extract mechanical power from the vortex, but to reduce induced drag at the same time. Yet another feature of the present invention is embodied in a device that utilizes the power generated from the turbine device for driving aircraft subsystems.

An advantage of the present invention is that drag can be reduced while mechanical power is extracted in one device. Another advantage of the present invention is that vortices can be limited or eliminated. Another advantage of the present invention is that power generated from the turbine device can be utilized for driving aircraft subsystems. Yet another advantage of the present invention is that it reduces the necessary distance between aircraft to allow more take-off and landings.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout.

DETAILED DESCRIPTION OF THE PREFERRED EMBODIMENT

Figure 1:
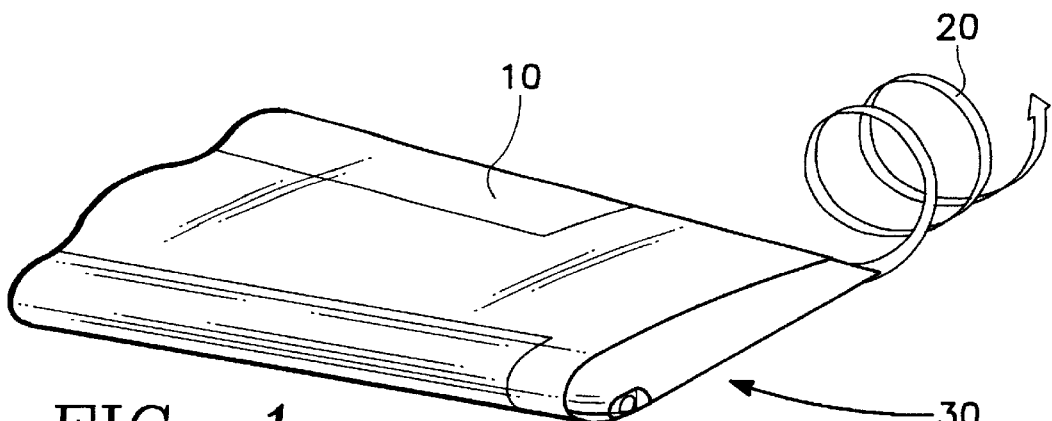
FIG. 1 is a perspective view illustrating a wingtip generating a vortex.

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.
Introduction:

FIG. 1 is a perspective view illustrating a wingtip creating a vortex. During take-off, landing, and flight of an aircraft, the aircraft's wing 10, as it travels through the air, creates a vortex 20 (a vortex is a high-velocity, helically rotating air mass) at the aircraft's wingtip 30. Since the vortex is a high-velocity rotating air mass, numerous problems can occur during flight, take-off, and landing of the aircraft.

Principally during flight of the aircraft, the vortex creates undesirable drag on the wing 10. To overcome that drag, more thrust is required from the engines, and the related increased fuel usage limits the distance the aircraft can fly. Furthermore, the vortex creates air traffic problems during take-off and landing. Because the vortices are high-velocity rotating air streams, a wingtip vortex of one aircraft can greatly disturb the air mass through which a following aircraft may pass. This vortex interference can lead to the loss of control of the following aircraft and thereby cause an accident. Consequently, aircraft are spaced great distances apart from each other during take-off and landing so that there is sufficient time for the wingtip vortexes to decay before they encounter another aircraft. This creates substantial delays and air traffic control problems. The vortex cancellation device of the present invention solves this problem by greatly reducing or eliminating wingtip vortices. Thus, with the present invention, the distance between aircraft during take-off and landing can be reduced to allow more take-offs and landings.

Figure 2:
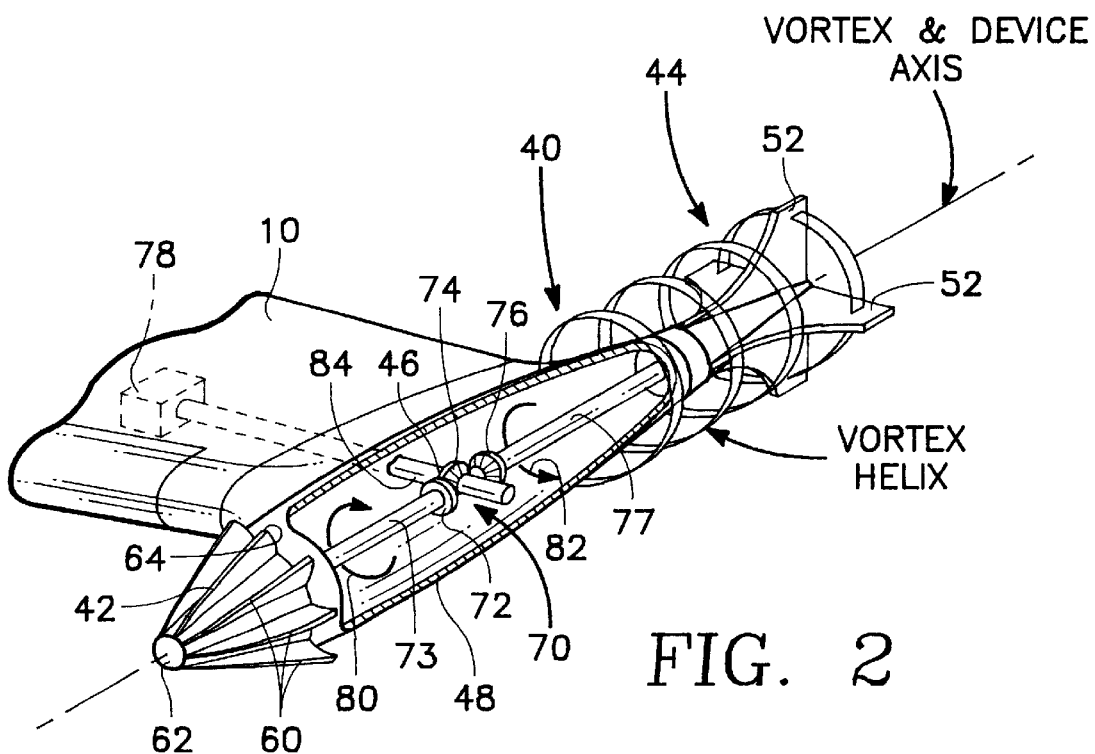
FIG. 2 illustrates a wingtip vortex device system of a first embodiment of the present invention.

Structure:

FIG. 2 illustrates a wingtip vortex device system of a first embodiment of the present invention. The wingtip vortex device 40 of the present invention is a self-contained system installed at the wingtips 30 of an aircraft for reducing aerodynamic drag. The wingtip vortex device 40 is driven by the whirl of the wingtip vortex 20, and in the process the vortex 20 is weakened, thereby reducing aerodynamic drag. As such, an external power source, such as the aircraft propulsion system, is not required to power the vortex device 40.

The wingtip vortex device consists of a slender, spindle-shaped body or pod 40 that incorporates rotary components at either end. The device is attached to the wingtip in a way that aligns its axis with that of the wingtip vortex 20. The length of the device is designed to place its leading rotary component, the impeller 42, ahead of the wing leading edge, and its trailing rotary component, the wind turbine 44, behind the wing trailing edge. During flight the (rear) wind turbine drives the (forward) impeller.

The impeller 42 consists of a rotatable body that acts as the hub for a multitude of fins or blades 60 extending radially therefrom. The impeller body forms the nose piece of the spindle-shaped wingtip vortex device 40 and as such has a conical or oval shape. The impeller fins 60 have a triangular or gothic planform; they may or may not have a small incidence relative to the axis of the body.

The wind turbine 44 likewise consists of a rotatable body that acts as the hub for a multitude of blades 52 extending radially therefrom. The wind turbine body forms the conical end piece of the pod 40. The planform of the turbine blades 52 is somewhat arbitrary. The blades 52, depicted in FIG. 2, feature a typical root chord extension from the blade leading edge; however, a deletion of the extension would also provide an acceptable solution. The blades may be twisted for optimum interaction with the radially changing vortex flowfield.

Impeller 42 and wind turbine 44 are attached to shafts 73 and 77, respectively, that extend into the inside of the pod 40. The shafts are supported by suitable bearings (not shown) inside the pod. The shafts 73, 77 accomplish a power transfer between impeller 42 and wind turbine 44 through an intermediate gearing device 46.

The intermediate gear device 46 can be of any design sufficient for coupling the rotary devices and for reversing the sense of their rotations. For example, FIG. 2 depicts the intermediate gear device 46 as a bevel set of reversing gears 70. The set comprises a first bevel gear 72 meshing with an intermediate second bevel gear 74 which meshes with a third bevel gear 76. The first bevel gear 72 is connected to the impeller shaft 73. The second bevel gear 74 is attached to the cross shaft 84 may couple the wingtip vortex device to an aircraft subsystem, such as a power generator 78. The third bevel gear 76 is connected to the wind turbine shaft 77. The power generator 78 is driven solely by the wind turbine 44 and does not require an additional power source. Bevel gears 72 and 76 and their respective shafts 73 and 77 are in coaxial alignment. The intermediate bevel gear 74 and its shaft 84 are positioned at a right angle relative to the shafts 73 and 77.

It should be noted that the intermediate gear device 70 of FIG. 2 can be a transmission device for achieving a difference in angular velocity between the impeller 42 and the wind turbine 44. This would allow the impeller 42 to rotate faster or slower than the wind turbine 44.

It is preferred that the vortex device axis is aligned with the wingtip vortex axis, which is nearly aligned with the free-stream vector. Hence, the vortex device 40 is preferably installed at a small (nose-down) inclination relative to the wingtip chord to account for the wing 10 being at an angle of attack.

Figure 3:
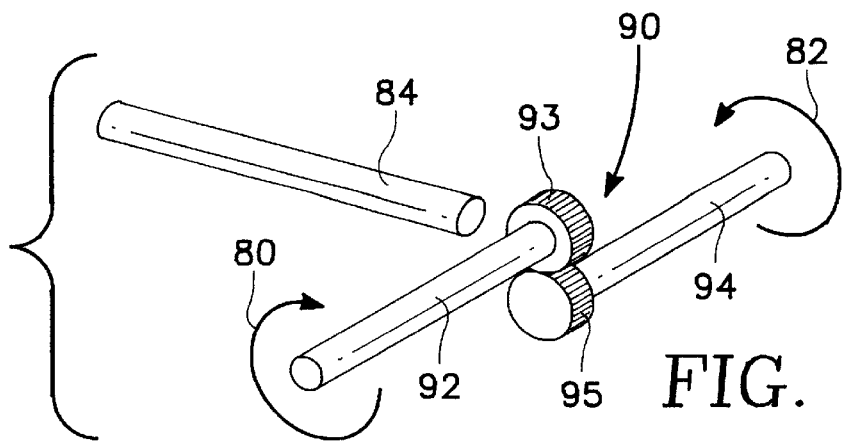
FIG. 3 illustrates a wingtip vortex device system of a second embodiment of the present invention.

FIG. 3 illustrates a wingtip vortex device system of a second embodiment of the present invention in which the impeller shaft 92 and the wind turbine shaft 94 are offset with respect to each other. Attached to the inboard ends of the shafts 92 and 94 are ordinary spur gears 93 and 95, which are in meshing contact and thereby accomplish turn reversal and power transfer. In contrast to the embodiment of FIG. 2, since the gears are axially offset, a third gear is not needed. An external device, such as a power generator, can be connected to cross shaft 84 which is coupled to either the impeller shaft 73 or the wind turbine shaft by means of bevel gears (not shown) similar to the embodiment of FIG. 2.

Operation:

Referring to FIG. 2, the wind turbine 44 is driven by the wingtip vortex 20 and rotates in the same direction as the wingtip vortex 20. Since the wind turbine 44 is coaxially aligned with the wingtip vortex 20, the wind turbine 44 is able to extract the swirl energy from the wingtip vortex 20. Because the wind turbine 44 and the impeller 42 are rotationally connected through the intermediate device 70 (a reversing gear unit, as discussed above), the wind turbine 44 rotationally drives the impeller 42 in opposite direction.

The wind turbine 44 preferably solely extracts the angular flow momentum from the wingtip vortex 20 and leaves the axial flow component unchanged in contrast to an ordinary wind turbine which retards axial flow. This is because axial flow retardation would lead to a drag increase. The angular flow energy to be extracted is energy associated with the generation of induced drag which is to be recaptured by the wind turbine 44. According to one study, as much as 84 percent of the induced drag is manifest in rotational kinetic energy of the wingtip vortex 20.

The impeller 42 rotates in an opposite direction to the wind turbine 44 and the wingtip vortex 20. Consequently, the rotation of the impeller 42 allows it to impart a swirl to the air flow streaming past it. Since the impeller 42 is also coaxially aligned with the wingtip vortex 20, the swirling action of the impeller 42 partially cancels the swirl of the wingtip vortex 20 before it reaches the wind turbine.

Therefore, the vortex device 40 of the present invention reduces induced drag without requiring an external power source, such as an aircraft propulsion system. In fact, the power throughput, inasmuch as the vortex energy is on the order of one half of the total drag at cruising flight conditions, is approximately equal to one half of the power provided by the propulsion units.

With regard to the operation of the gear arrangement of FIG. 2 of the present invention, the gear device 70 couples the impeller 42 and wind turbine 44 together by transmitting input rotation 82 (third bevel gear 76) to output rotation 80 (first bevel gear 72) in a reverse direction via intermediate rotation 84 (second bevel gear 74).

In addition, the intermediate rotation 84 of the second bevel gear 74 not only transmits rotation from the first bevel gear 72 to the second bevel gear 76, it also can be used to transmit power to a power generator 78. It is important to note that the power generator 78 is driven solely by the input and output rotations 82, 80, and does not require an additional power source.

As noted above, the wind turbine 44 rotates in the same direction as the vortex 20, which is in an opposite direction to that of the impeller 42. Therefore, the wingtip vortex device 40 reduces the wingtip vortex 20 swirl in two stages. First through the counter-swirl generated by the impeller 42, and then through the vortex swirl extraction of the wind turbine 44. As such, both the impeller 42 and the wind turbine 44 weaken the wingtip vortex 20, thereby reducing the downwash induced by the wingtip vortex 20 onto the wing 10. As a result, induced drag, which is caused by downwash, is reduced.

It is important to note that although the wingtip vortex device 40 generates drag on its own (unrelated to its rotary action), the induced-drag reduction outweighs the device's drag, especially at maneuvering flight conditions where induced drag is a multiple of the zero lift drag.

Almost any existing and future aircraft, including sailplanes and gliders, can utilize the wingtip vortex device of the present invention. If high total system efficiencies can be achieved, the design of aircraft utilizing the wingtip vortex device of the present invention could be materially affected. For instance, wing span would become less important as it would loose much of its induced drag determinacy. Shorter-span wings generate stronger tip vortices providing the vortex devices with a higher amount of vortex energy for conversion.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An aerodynamic drag reduction and vortex cancellation system for a wingtip of a wing of an aircraft, the wingtip having a wingtip chord, said system comprising:

an impeller located at a front position of the wingtip chord;

a wind turbine device located at a back position of the wingtip chord in close proximity to high-velocity vortex forces created by the wingtip for rotating said wind turbine device in a similar rotational direction to that of the vortex forces; and an intermediate gear device for coupling said impeller to said wind turbine device, wherein said intermediate gear device generates power from the vortex-driven turbine to rotate said impeller in an opposing rotational direction to that of the vortex forces to thereby reduce downwash induced by said vortex forces exerted on the wing for inducing drag reduction and vortex cancellation.

2. The aerodynamic drag reduction and vortex cancellation system of claim 1, wherein said intermediate gear device is a bevel set of reversing gears.

3. The aerodynamic drag reduction and vortex cancellation system of claim 2, wherein said bevel set comprises a first bevel gear meshing with an intermediate second bevel gear meshing with a third bevel gear.

4. The aerodynamic drag reduction and vortex cancellation system of claim 3, wherein said first bevel gear is connected to said impeller, said second bevel gear is attached to a power generator, and said third bevel gear is connected to said wind turbine.

5. The aerodynamic drag reduction and vortex cancellation system of claim 4, wherein said power generator is driven solely by said impeller and said wind turbine and does not require an additional power source.

6. The aerodynamic drag reduction and vortex cancellation system of claim 3, wherein said bevel gears are in coaxial alignment.

7. The aerodynamic drag reduction and vortex cancellation system of claim 1, wherein said intermediate gear device is a transmission device for achieving a difference in angular velocity between said impeller and said wind turbine to allow said impeller to rotate at a different speed than said wind turbine.

8. The aerodynamic drag reduction and vortex cancellation system of claim 1, wherein said system is aligned with said wingtip at a vortex axis that is approximately aligned with a free-stream vector.

9. The aerodynamic drag reduction and vortex cancellation system of claim 1, wherein said system is located at an inclination relative to the wingtip chord to account for said wing being at an angle of attack.

10. The aerodynamic drag reduction and vortex cancellation system of claim 1, wherein said wind turbine rotates in the same direction as the vortex forces and in an opposite direction to the rotation of said impeller.

11. An aerodynamic drag reduction and vortex cancellation system for an aircraft wingtip characterized by a wingtip vortex induced adjacent thereto, the wingtip vortex having vortex forces, the system comprising:

a wind turbine device disposed aft of the wingtip, in fluid communication with the wingtip vortex, sized and configured to rotate in response to the vortex forces; and an impeller disposed forward of the wingtip, in mechanical communication with the wind turbine device, sized and configured to rotate in an opposing rotational direction from that of the wind turbine device in response to rotation of the wind turbine device for mitigating the wingtip vortex and reducing aerodynamic drag.

12. The aerodynamic drag reduction and vortex cancellation system of claim 11 further comprises an intermediate gear device for coupling the impeller to the wind turbine device.

13. The aerodynamic drag reduction and vortex cancellation system of claim 12 wherein the intermediate gear device comprises a bevel set of reversing gears.

14. The aerodynamic drag reduction and vortex cancellation system of claim 12 wherein the intermediate gear device is a transmission device sized and configured to rotate the impeller and the wind turbine device at variable angular velocities with respect to one another.

15. The aerodynamic drag reduction and vortex cancellation system of claim 11 further comprises a power generation device in mechanical communication with the wind turbine device for extracting power from the wingtip vortex.

16. The aerodynamic drag reduction and vortex cancellation system of claim 11 wherein the wind turbine device has an axis of rotation, the angular orientation of the axis of rotation is adjustable.

17. The aerodynamic drag reduction and vortex cancellation system of claim 11 wherein the impeller has an axis of rotation, the angular orientation of the axis of rotation is adjustable.

18. An aerodynamic drag reduction and vortex cancellation system comprising:
   an aircraft wing having an aircraft wingtip characterized by a wingtip vortex induced adjacent thereto, the wingtip vortex having vortex forces;
   a wind turbine device disposed aft of the wingtip, in fluid communication with the wingtip vortex, sized and configured to rotate in response to the vortex forces; and
   an impeller disposed forward of the wingtip, in mechanical communication with the wind turbine device, sized and configured to rotate in an opposing rotational direction from that of the wind turbine device in response to rotation of the wind turbine device for mitigating the wingtip vortex and reducing aerodynamic drag.

19. A method of reducing aerodynamic drag reduction and canceling vortex forces adjacent an aircraft wingtip characterized by a wingtip vortex induced adjacent thereto, the wingtip vortex having vortex forces, the system, the method comprising the steps of:
   locating a wind turbine device disposed aft of the wingtip;
   disposing the wind turbine device in fluid communication with the wingtip vortex;
   forming the wind turbine device to rotate in response to the vortex forces;
   locating an impeller disposed forward of the wingtip, disposing the impeller in mechanical communication with the wind turbine device; and
   forming the impeller to rotate in an opposing rotational direction from that of the wind turbine device in response to rotation of the wind turbine device for mitigating the wingtip vortex and reducing aerodynamic drag.

20. The method of reducing aerodynamic drag reduction and canceling vortex forces of claim 19 wherein the impeller and the wind turbine device are formed to rotate variable angular velocities with respect to one another.

21. The method of reducing aerodynamic drag reduction and canceling vortex forces of claim 19 further comprises the step of respectively regulating the angular velocity of the wind turbine device and impeller with respect to one another.

22. The method of reducing aerodynamic drag reduction and canceling vortex forces of claim 19 further comprises the step of attaching a power generation device in mechanical communication with the wind turbine device for extracting power from the wingtip vortex.

23. The method of reducing aerodynamic drag reduction and canceling vortex forces of claim 19 wherein the wind turbine device has an axis of rotation, the method further comprises the step of adjusting the angular orientation of the axis of rotation of the wind turbine device.

24. The method of reducing aerodynamic drag reduction and canceling vortex forces of claim 19 wherein the impeller has an axis of rotation, the method further comprises the step of adjusting the the angular orientation of the axis of rotation of the impeller.

\* \* \* \* \*